W. A. FORCE.
ENGINE.
APPLICATION FILED SEPT. 12, 1917.
1,278,083.
Patented Sept. 3, 1918.
2 SHEETS—SHEET 1.
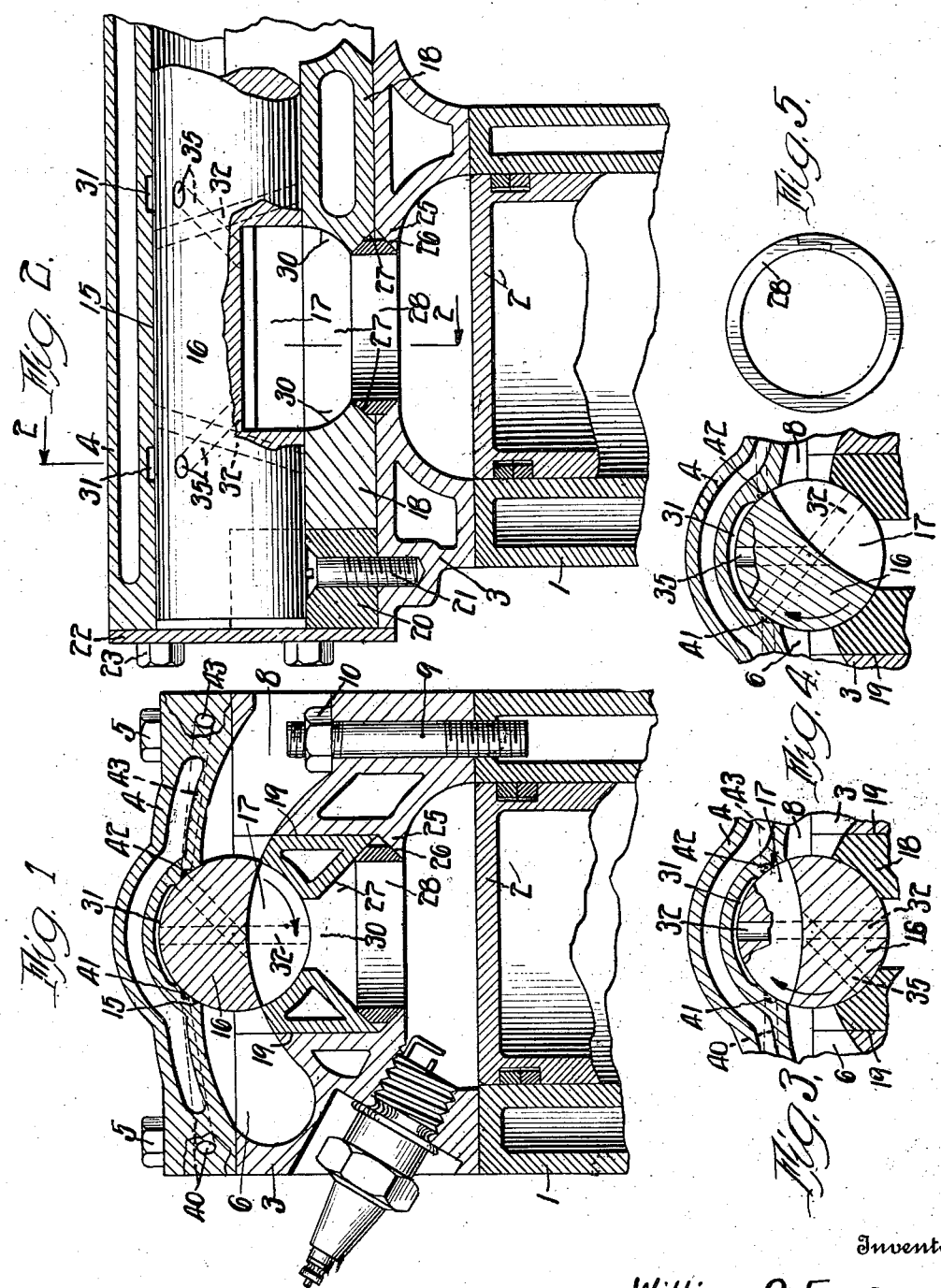
Inventor
William A. Force,
By Pagelsen & Spencer
Attorneys
Witness
J. D. Patee.

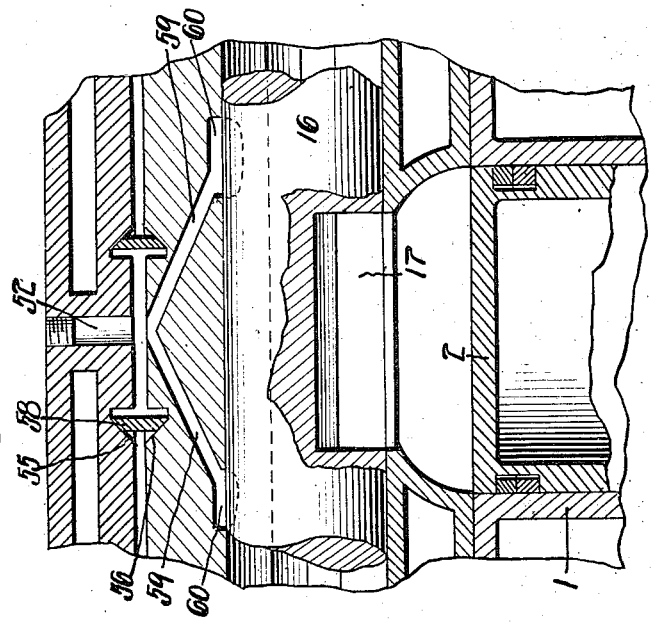
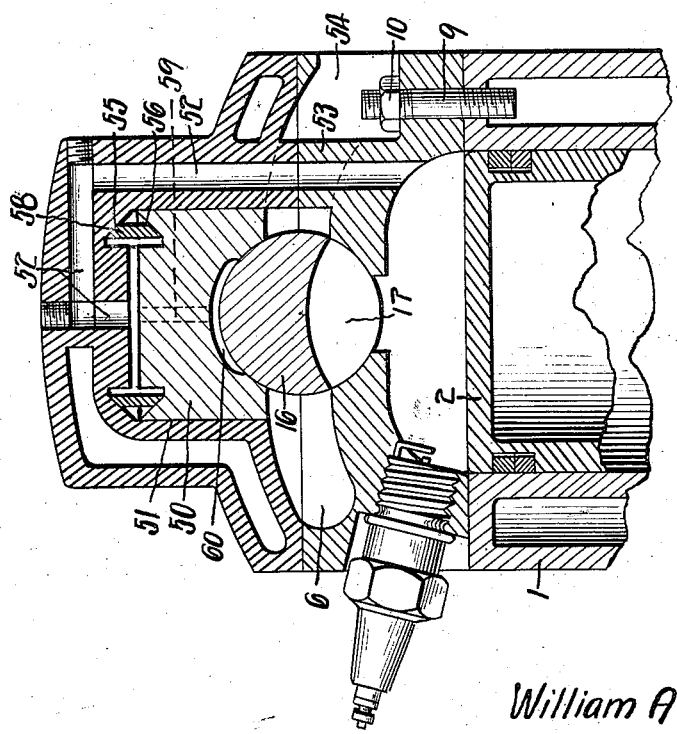

UNITED STATES PATENT OFFICE.

WILLIAM A. FORCE, OF DETROIT, MICHIGAN.

ENGINE.

1,278,083.  Specification of Letters Patent.  Patented Sept. 3, 1918.

Application filed September 12, 1917. Serial No. 191,024.

*To all whom it may concern:*

Be it known that I, WILLIAM A. FORCE, a citizen of the United States, and residing at Detroit, in the county of Wayne and State of Michigan, have invented a new and Improved Engine, of which the following is a specification.

The theoretical advantages of the rotary type of valve for internal combustion engine service are well known, but such valves have been found in practice to be unsuccessful, primarily on account of failure to properly seal the passages or because of too great friction under certain conditions, or for both reasons. It is the purpose of the present invention to overcome these difficulties by providing a movable block or blocks in engagement with the face of the valve, and wherein, although a large bearing area is obtained, the pressure of the block on the valve is comparatively small.

Another feature of the invention consists in an arrangement of passages and chambers whereby the pressure exerted directly on the valve by the compressed or exploding fluids in the cylinder is offset or neutralized by the simultaneous application of fluid pressure to the side of the valve opposite or most remote from the cylinder. Again, the invention consists in certain means whereby the last named fluid pressures are relieved as the pressures in the cylinders fall.

The invention also consists in an expansion ring arranged to wedge against the block in accordance with the pressure in the cylinder to both seal the joint between the block and the adjacent engine wall and establish a resultant pressure tending to hold the block in sealing engagement with the valve.

The invention may be applied to various constructions other than those shown, and the drawings are therefore to be regarded as diagrammatic rather than as restrictive.

In the drawings, Figure 1 is a transverse vertical section on the line 2—2 of Fig. 2 of enough of an internal combustion engine to show one manner of applying the invention. Fig. 2 is a central longitudinal vertical section corresponding to Fig. 1. Fig. 3 is a fragmentary view, corresponding to Fig. 1, showing the valve at the time of explosion. Fig. 4 is a similar section showing the valve at the time the pressure chambers are being vented. Fig. 5 is a plan view of the spring for the movable portion of the valve seat. Figs. 6 and 7 are sections, similar to Figs. 1 and 2, showing a modification.

The cylinders, water jacketed in the ordinary way, appear at 1 and reciprocating therein are the pistons 2. As shown, the cylinder heads or valve casings are formed in two pieces—a base 3 and a cover 4—connected by bolts 5 and together forming the intake and exhaust passages 6 and 8. Various means may be employed for securing the base to the cylinders, for example, the screw bolts 5 might extend through the base and into the cylinders as is obvious; it is preferred, however, to fasten the base to the cylinders and the covers to the base, and, as shown, the connection between the base and the cylinders may include, on the exhaust side, screw bolts 9, the nuts 10 of which are located within the corresponding exhaust passage.

Formed in the lower side of the cover is a fixed portion 15 of a seat for a valve 16, the latter of which has ports 17 in proper angular relation to one another and may be rotated continuously in one direction by a suitable valve gear (not shown). The remainder or opposite side of the valve seat is formed in a block 18 which is movable toward and from the valve between the parallel walls 19 of the base 3. The blocks may be made separately for each cylinder or integral with one another as shown. Adjoining the end block a filler 20 (Fig. 2) may be employed, it being preferably rigidly secured to the base by a screw 21, and the ends of the base and cover may be sealed by a plate 22 and bolts 23 in an obvious manner.

It will be observed that the walls 19 terminate in the curved walls or ledges 25 the upper surfaces 26 of which incline outwardly from their inner edges and away from the corresponding cylinder. In like manner, the lower faces 27 of the blocks are inclined—oppositely, however, to the surfaces 26—to form therewith a substantially V shaped annular groove in which a split expansion ring 28 is received; and the latter has its upper and lower faces inclined to conform to the walls of the groove, from which it follows that the blocks are forced into close engagement with the valve as the rings expand. While the rings may be resilient and thus tend, in themselves, to force the blocks against the valve, the pressure on the latter is primarily dependent on the wedging action of the rings as they are spread apart by the pressures of gas in the cylinder. It will be observed also, that the rings seal the joint between the walls 19 and the blocks and prevent leakage.

Were no means provided to offset it, both the explosion and compression of gas in the cylinders would force the blocks upwardly under heavy pressure against the valve. The upper faces of the blocks are therefore dished or inclined, adjacent the ends of the ports 17, as indicated at 30, and the nearer the projected area of these inclined or dished surfaces is made to equal the projected area of the lower inclined surfaces 27, the more nearly balanced the blocks will be so far as direct pressure is concerned. Thus the actual pressure between the blocks and the valve may be made substantially only what results from the expansion of the rings, which results in a minimum friction. The free passage through the block 18 may also, in this manner, be made equal to that through the ring, thus giving rise to a free intake and scavenging action.

It is also evident that, were no means provided to offset it, the valve pressure on the surface 15 would be substantially equal to the product of the area of the inner wall of the port 17 and the maximum unit pressure. This may, however, be wholly or partly neutralized by forming in the surface 15 shallow chambers 31 and by piercing the valve to form the transverse passages 32, whereby, when the valve is in the position indicated in Fig. 3, the high pressures of the compression and explosion portions of the cycle are communicated to its upper surface. By making these chambers equal in area to the area over which the gases contact with the lower surface of the valve, the latter would be substantially balanced. The actual construction of these passages 32 may vary considerably, but it is convenient to incline them longitudinally of the valve in such manner that but one of their ends namely, that in the side of the valve, most remote from the corresponding port, ever sweeps across the passage in the block 18; the other ends of the passages simultaneously register with the corresponding chamber 31, as shown in Fig. 3. In order to relieve the pressures in the chambers as the pressure in the cylinder falls, the valves are also provided with vent passages 35 that pass from the ports through to points in the same plane transversely of the valve as the corresponding chamber 31. Therefore, when the valve is open for exhaust (Fig. 4), a free passage is formed through from the chambers to the passage through which the gases are flowing. Thus the friction producing pressures are kept at a minimum and expansion of the valve is freely allowed.

Lubricating oil may be pumped to the valve through a passage 40 and a longitudinally extending groove 41 and may be collected and drawn off at the opposite side by the groove 42 and passage 43 (Fig. 1), it being remembered that the direction of rotation is clockwise in this figure. The grooves 41—42, are, of course, not continuous across the ports 17.

Modification, Figs. 6 and 7: In this instance the movable block 50, which corresponds to the block 18, is located above the valve and slides between parallel walls 51 in the cover. A passage 52, part of which extends through a pillar 53 in the exhaust passage 54, leads upwardly to the space behind the block and tends to maintain the pressure on the latter the same as that in the corresponding cylinder. Inclined surfaces 55 and 56 on the cover and valve, respectively, form an annular V-shaped groove in which a ring 58, similar to the rings 28, is received as before. Passages 59, which communicate with the passage 52, are inclined longitudinally of the valve and lead to chambers 60 in the blocks, the function of these passages and chambers being to diminish the pressure between the blocks and the valve and thus reduce friction in a manner somewhat similar to the described operation of the chambers 31 and passages 32—35. The rings 58 prevent the escape of gas into the space between the cover and the block or blocks, and, by a wedging action force the blocks into snug engagement with the valve as before.

As stated heretofore, the actual details of construction may be varied within wide limits without departing from the spirit of the invention, and I do not, therefore, wish to be limited except as indicated by the subjoined claims.

I claim:

1. An engine comprising a cylinder and means for both supplying working fluid thereto and allowing it to escape therefrom, said means comprising a casing having intake and exhaust passages, a rotary valve for successively opening communication between the passages and the cylinder, a block guided by the casing and slidable toward and from the valve, to form a seal therewith, and an expansible ring having a portion forming part of the surface of a cone, said block having a similar surface with which the first mentioned surface engages, the inner surface of the ring being open to the pressure of the fluids in the cylinder, said casing having a surface coöperating with the ring to prevent movement of the latter away from the block, whereby said ring is caused to expand and actively force the block against the valve.

2. An engine comprising a cylinder and means for both supplying working fluid thereto and allowing it to escape therefrom, said means comprising a casing having intake and exhaust passages, a rotary valve for successively opening communication between the passages and the cylinder, a block guided by the casing and slidable toward and from the valve to form a seal therewith, said casing and said block having opposed annular conical surfaces forming an annular V-shaped groove, and an expansible ring located in the groove and conforming to the walls thereof, the inner face of the groove being exposed to substantially the same pressures as are found in the cylinder, whereby the ring is caused to expand and cause a sealing action between the block and the valve substantially in accordance with the variations in the pressure within the cylinder, and whereby the joint between the block and the casing is sealed.

3. An engine comprising a cylinder and means for supplying working fluid thereto, said means comprising a ported valve and an apertured casing for the valve, said casing having a fixed seat, in respect to which the valve has angular movement, a block conforming to the valve on the side opposite the seat, and being movable toward and from the valve, said block having a depression in its surface nearest the valve and said depression being in free communication with the space within the cylinder, whereby the pressure of the working fluid tends to force the block away from the valve, and means, also dependent on the pressure within the cylinder for overcoming the first mentioned tendency and holding the block in close engagement with the valve.

4. In an internal combustion engine, a cylinder, a valve casing comprising intake and exhaust passages, a ported rotary valve for controlling communication between the cylinder and said passages, a block movable toward and from said valve and conforming to the surface thereof, said block having an opening leading to the cylinder in position to communicate with the port in the valve, the entrance to the opening which is adjacent the valve being elongated lengthwise of the valve, the other entrance being circular in cross section and of considerably less diameter than the maximum dimensions of the first named opening, and an expansion ring for forcing the block toward the valve substantially in accordance with the pressure in the cylinder.

5. An internal combustion engine comprising a cylinder, a fixed valve casing having intake and exhaust passages therein, a rotary valve for controlling the communication between the cylinder and said passages, said valve having a port, a pressure chamber formed in the casing at a point out of registration with the port throughout the entire rotation of the valve, the valve having a passage extending from said port to a point in the valve which registers with the pressure chamber during the time the higher pressures occur in the engine whereby the chamber is brought into communication with the cylinder during those parts of the engine cycle in which the higher pressures occur, whereby the more direct pressures of the fluids on the valve are wholly or partly offset.

6. An internal combustion engine comprising a cylinder, a fixed valve casing having intake and exhaust passages therein, a substantially cylindrical rotary valve for controlling the communication between the cylinder and said passages, said valve having a port, means for forming a pressure chamber on the side of the valve most remote from the cylinder, said chamber being out of registration with the port throughout the entire rotation of the valve, and means whereby the pressures from the cylinder are admitted to said chamber to wholly or partly offset the more direct pressure of the fluids on the valve.

7. An internal combustion engine comprising a cylinder, a fixed valve casing having intake and exhaust passages therein, a rotary valve for controlling the communication between the cylinder and said passages, said valve having a port, a pressure chamber formed in the casing at a point out of registration with the port, the valve having a passage whereby the chamber is brought into communication with the cylinder during those parts of the engine cycle in which the higher pressures occur, said valve also having an additional passage whereby the chamber is later brought into communication with the exhaust passage to allow the relief of the high pressures in said chamber.

WILLIAM A. FORCE.